US012271030B2

(12) United States Patent
Bian et al.

(10) Patent No.: US 12,271,030 B2
(45) Date of Patent: Apr. 8, 2025

(54) OPTICAL COUPLERS FOR TRANSITIONING BETWEEN A SINGLE-LAYER WAVEGUIDE AND A MULTIPLE-LAYER WAVEGUIDE

(71) Applicant: GlobalFoundries U.S. Inc., Malta, NY (US)

(72) Inventors: Yusheng Bian, Ballston Lake, NY (US); Won Suk Lee, Malta, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 215 days.

(21) Appl. No.: 17/952,969

(22) Filed: Sep. 26, 2022

(65) Prior Publication Data

US 2024/0103221 A1 Mar. 28, 2024

(51) Int. Cl.
| | | |
|---|---|---|
| *G02B 6/122* | (2006.01) | |
| *G02B 6/12* | (2006.01) | |
| *G02B 6/13* | (2006.01) | |

(52) U.S. Cl.
CPC ............ *G02B 6/1228* (2013.01); *G02B 6/13* (2013.01); *G02B 6/12002* (2013.01); *G02B 2006/12061* (2013.01); *G02B 2006/12147* (2013.01); *G02B 2006/1215* (2013.01)

(58) Field of Classification Search
CPC .... G02B 6/1228; G02B 6/13; G02B 6/12002; G02B 2006/12061; G02B 2006/12147; G02B 2006/1215
See application file for complete search history.

(56) References Cited

U.S. PATENT DOCUMENTS

| | | | | |
|---|---|---|---|---|
| 9,671,560 | B1* | 6/2017 | Fondeur | G02B 6/14 |
| 10,429,582 | B1* | 10/2019 | Bian | G02B 6/12002 |
| 11,029,465 | B1 | 6/2021 | Rakowski et al. | |
| 11,125,944 | B2* | 9/2021 | Bian | G02B 6/126 |
| 11,150,407 | B2* | 10/2021 | Bian | G02B 6/1228 |
| 11,181,693 | B1 | 11/2021 | Bian | |
| 2017/0139132 | A1* | 5/2017 | Patel | G02B 6/4206 |
| 2018/0372957 | A1* | 12/2018 | Wang | G02B 6/2773 |

(Continued)

FOREIGN PATENT DOCUMENTS

EP 4296735 A1 12/2023

OTHER PUBLICATIONS

European Patent Office, Extended European Search Report and Opinion issued in European Patent Application No. 23189909.7 on Feb. 1, 2024; 9 pages.

(Continued)

*Primary Examiner* — Ryan A Lepisto
*Assistant Examiner* — Erin D Chiem
(74) *Attorney, Agent, or Firm* — Thompson Hine LLP; Anthony Canale

(57) ABSTRACT

Structures for an optical coupler and methods of forming a structure for an optical coupler. The structure comprises a stacked waveguide core including a first waveguide core and a second waveguide core. The first waveguide core includes a first tapered section, and the second waveguide core includes a second tapered section positioned to overlap with the first tapered section. The structure further comprises a third waveguide core including a third tapered section positioned adjacent to the first tapered section of the first waveguide core and the second tapered section of the second waveguide core.

20 Claims, 10 Drawing Sheets

(56) References Cited

U.S. PATENT DOCUMENTS

| | | | |
|---|---|---|---|
| 2019/0170936 A1* | 6/2019 | Qi | G02B 6/124 |
| 2021/0199887 A1* | 7/2021 | Bian | G02B 6/126 |
| 2021/0239903 A1* | 8/2021 | Bian | G02B 6/12002 |
| 2021/0294035 A1* | 9/2021 | Bian | G02B 6/26 |
| 2022/0252790 A1 | 8/2022 | Dezfulian et al. | |

OTHER PUBLICATIONS

Arnab Dewanjee, Jan Niklas Caspers, James Stewart Aitchison, and Mo. Mojahedi, "Demonstration of a compact bilayer inverse taper coupler for Si-photonics with enhanced polarization insensitivity," Optics Express 24, 28194-28203 (2016).

Amir H. Hosseinnia, Amir H. Atabaki, Ali A. Eftekhar, and Ali Adibi, "High-quality silicon on silicon nitride integrated optical platform with an octave-spanning adiabatic interlayer coupler," Optics Express 23, 30297-30307 (2015).

Kuanping Shang, Shibnath Pathak, Binbin Guan, Guangyao Liu, and S. J. B. Yoo, "Low-loss compact multilayer silicon nitride platform for 3D photonic integrated circuits," Optics Express 23, 21334-21342 (2015).

W. D. Sacher et al., "Monolithically Integrated Multilayer Silicon Nitride-on-Silicon Waveguide Platforms for 3-D Photonic Circuits and Devices," in Proceedings of the IEEE, vol. 106, No. 12, pp. 2232-2245, Dec. 2018, doi: 10.1109/JPROC.2018.2860994.

Yun, Han & Shi, Wei & Wang, Yun & Chrostowski, Lukas & Jaeger, Nicolas. (2013). "2×2 Adiabatic 3-dB Coupler on Silicon-on-Insulator Rib Waveguides." Proceedings of SPIE. 8915. 10.1117/12.2037968.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al, "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Monolithically integrated silicon nitride platform," 2021 Optical Fiber Communications Conference and Exhibition (OFC), 2021, pp. 1-3.

A. Aboketaf et al., "Towards fully automated testing and characterization for photonic compact modeling on 300-mm wafer platform," 2021 Optical Fiber Communications Conference and Exhibition (OFC), 2021, pp. 1-3.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3.

Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.

Bian, Yusheng et al., "Photonic Integrated Circuit Structure With Supplemental Waveguide-Enhanced Optical Coupling Between Primary Waveguides" filed on Aug. 25, 2021 as a U.S. Appl. No. 17/411,106.

Bian, Yusheng et al., "Wavelength Division Multiplexing Filters Including a Subwavelength Grating" filed on Oct. 26, 2021 as a U.S. Appl. No. 17/510,910.

Bian, Yusheng, "Optical Couplers With Diagonal Light Transfer" filed on Nov. 11, 2021 as a U.S. Appl. No. 17/524,218.

Bian, Yusheng, "Photonics Chips With Reticle Stitching by Side-By-Side Tapered Sections" filed on Jun. 8, 2022 as a U.S. Appl. No. 17/835,513.

* cited by examiner

OPTICAL COUPLERS FOR TRANSITIONING BETWEEN A SINGLE-LAYER WAVEGUIDE AND A MULTIPLE-LAYER WAVEGUIDE

BACKGROUND

The disclosure relates to photonics chips and, more specifically, to structures for an optical coupler and methods of forming a structure for an optical coupler.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

An optical coupler is an optical component used in a photonics chip to transfer optical power from one waveguide core to another waveguide core. An optical coupler may also be used to split optical power between the waveguide cores with a desired coupling ratio. Conventional optical couplers may have a large footprint, may be wavelength dependent, and may exhibit a high loss.

Improved structures for an optical coupler and methods of forming a structure for an optical coupler are needed.

SUMMARY

In an embodiment of the invention, a structure comprises a stacked waveguide core including a first waveguide core and a second waveguide core. The first waveguide core includes a first tapered section, and the second waveguide core includes a second tapered section positioned to overlap with the first tapered section. The structure further comprises a third waveguide core including a third tapered section positioned adjacent to the first tapered section of the first waveguide core and the second tapered section of the second waveguide core.

In an embodiment of the invention, a method comprises forming a stacked waveguide core including a first waveguide core and a second waveguide core. The first waveguide core includes a first tapered section, and the second waveguide core includes a second tapered section positioned to overlap with the first tapered section. The method further comprises forming a third waveguide core including a third tapered section positioned adjacent to the first tapered section of the first waveguide core and the second tapered section of the second waveguide core.

BRIEF DESCRIPTION OF THE DRAWINGS

The accompanying drawings, which are incorporated in and constitute a part of this specification, illustrate various embodiments of the invention and, together with a general description of the invent ion given above and the detailed description of the embodiments given below, serve to explain the embodiments of the invention. In the drawings, like reference numerals refer to like features in the various views.

DETAILED DESCRIPTION

Figure 1:
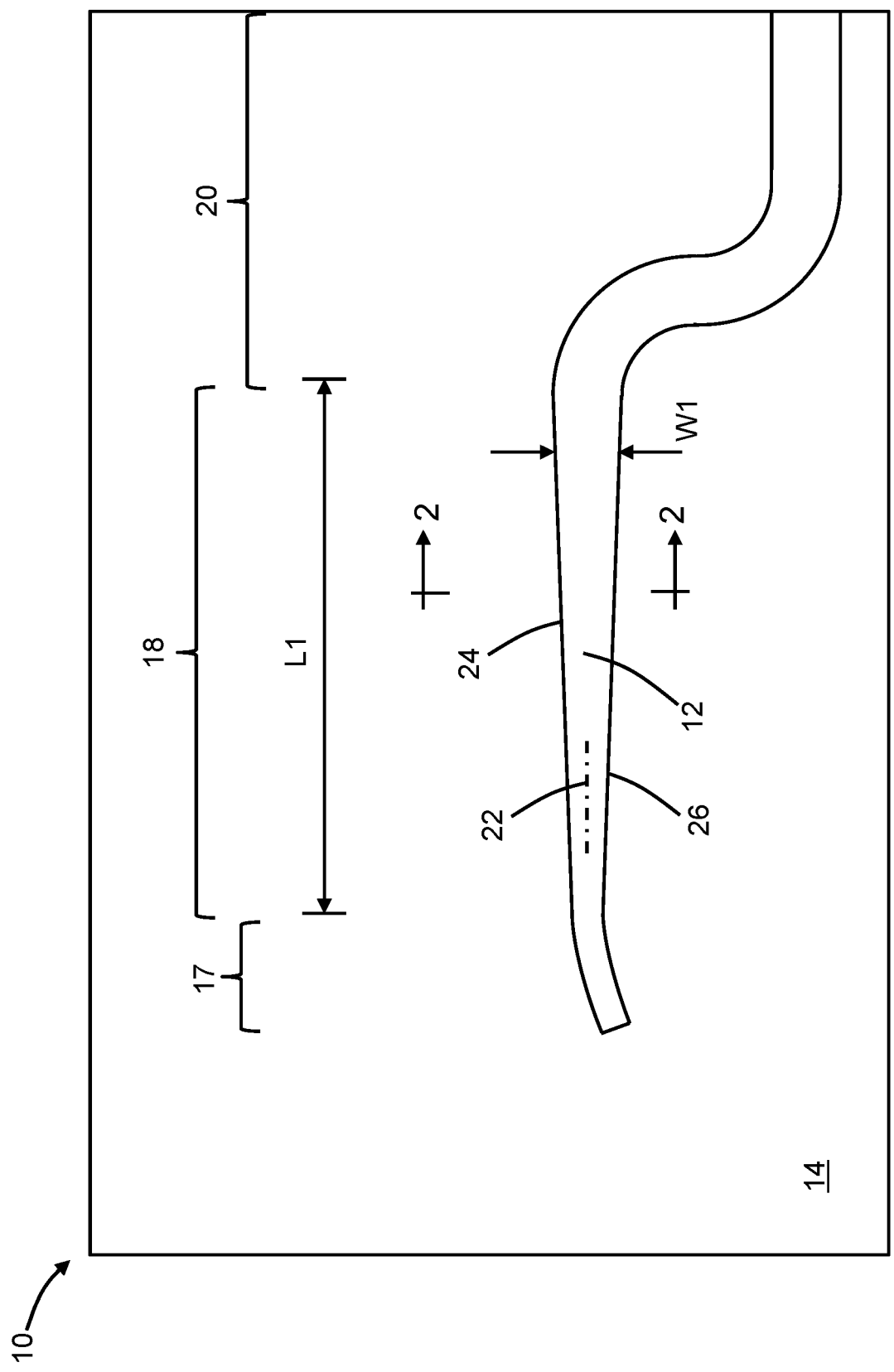
FIG. 1 is a top view of a structure at an initial fabrication stage of a processing method in accordance with embodiments of the invention.
Figure 2:
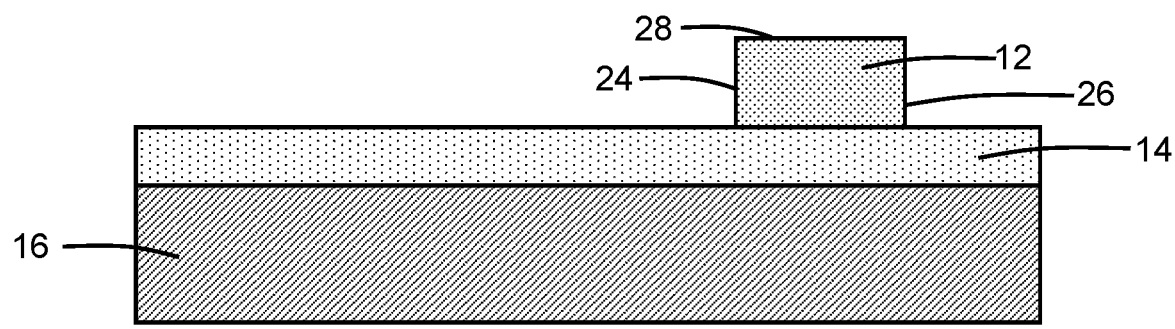
FIG. 2 is a cross-sectional view of the structure taken generally along line 2-2 in FIG. 1.

With reference to FIGS. 1, 2 and in accordance with embodiments of the invention, a structure 10 for an optical coupler includes a waveguide core 12 that is positioned on, and over, a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the waveguide core 12 from the substrate 16. In an alternative embodiment, one or more additional dielectric layers comprised of, for example, silicon dioxide may be positioned between the waveguide core 12 and the dielectric layer 14.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon or polysilicon. In an alternative embodiment, the waveguide core 12 may be comprised of a dielectric material, such as silicon nitride, silicon oxynitride, or aluminum nitride. In alternative embodiments, other materials, such as a polymer or a III-V compound semiconductor, may be used to form the waveguide core 12.

In an embodiment, the waveguide core 12 may be formed by patterning a layer comprised of a material with lithography and etching processes. In an embodiment, an etch mask may be formed by a lithography process over the layer, and unmasked sections of the deposited layer may be etched and removed with an etching process. The shape of the etch mask may determine the patterned shape of the waveguide core 12. In an embodiment, the waveguide core 12 may be formed by patterning the semiconductor material (e.g., single-crystal silicon) of a device layer of a silicon-on-insulator substrate. In an embodiment, the waveguide core 12 may be formed by patterning a deposited layer comprised of the material (e.g., polysilicon). In an alternative embodiment, a slab layer may be connected to a lower portion of the waveguide core 12. The slab layer may be formed when the waveguide core 12 is patterned, and the slab layer, which is positioned on the dielectric layer 14, may have a thickness that is less than the thickness of the waveguide core 12.

The waveguide core 12 includes a tapered section 18 and an output section 20 connected to the tapered section 18. In an embodiment, the tapered section 18 may be connected to a bend 17 defining a terminator. The output section 20 of the waveguide core 12 may include a series of bends that laterally displace the routing of the waveguide core 12. The tapered section 18, which extends with a length L1 along a longitudinal axis 22, has opposite sidewalls 24, 26 and a top surface 28 that extends from the sidewall 24 to the sidewall 26.

The waveguide core 12 may have a width dimension W1 that varies over its length. In an embodiment, the width dimension W1 of the tapered section 18 of the waveguide core 12 may increase with decreasing distance from the output section 20. In an embodiment, the width dimension W1 of the tapered section 18 may linearly increase with decreasing distance from the output section 20. In an alternative embodiment, the width dimension W1 of the tapered section 18 may increase with decreasing distance from the output section 20 based on a non-linear function, such as a quadratic function, a cubic function, a parabolic function, a sine function, a cosine function, a Bezier function, or an exponential function. In an embodiment, the tapered section 18 may have a uniform taper angle. In an alternative embodiment, the tapered section 18 may taper in multiple stages each having a different taper angle.

Figure 4:
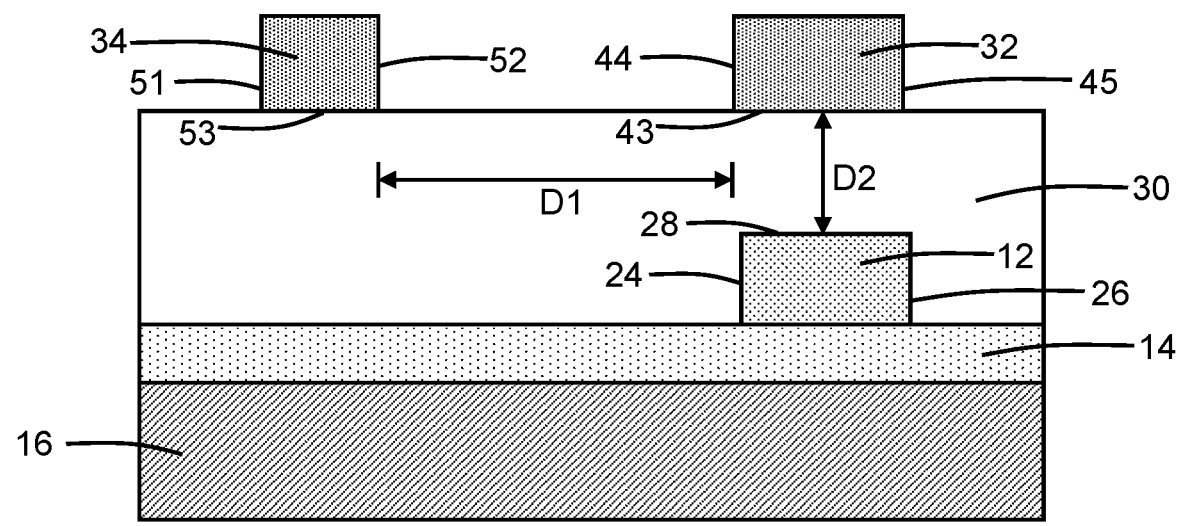
FIG. 4 is a cross-sectional view of the structure taken generally along line 4-4 in FIG. 3.
Figure 3:
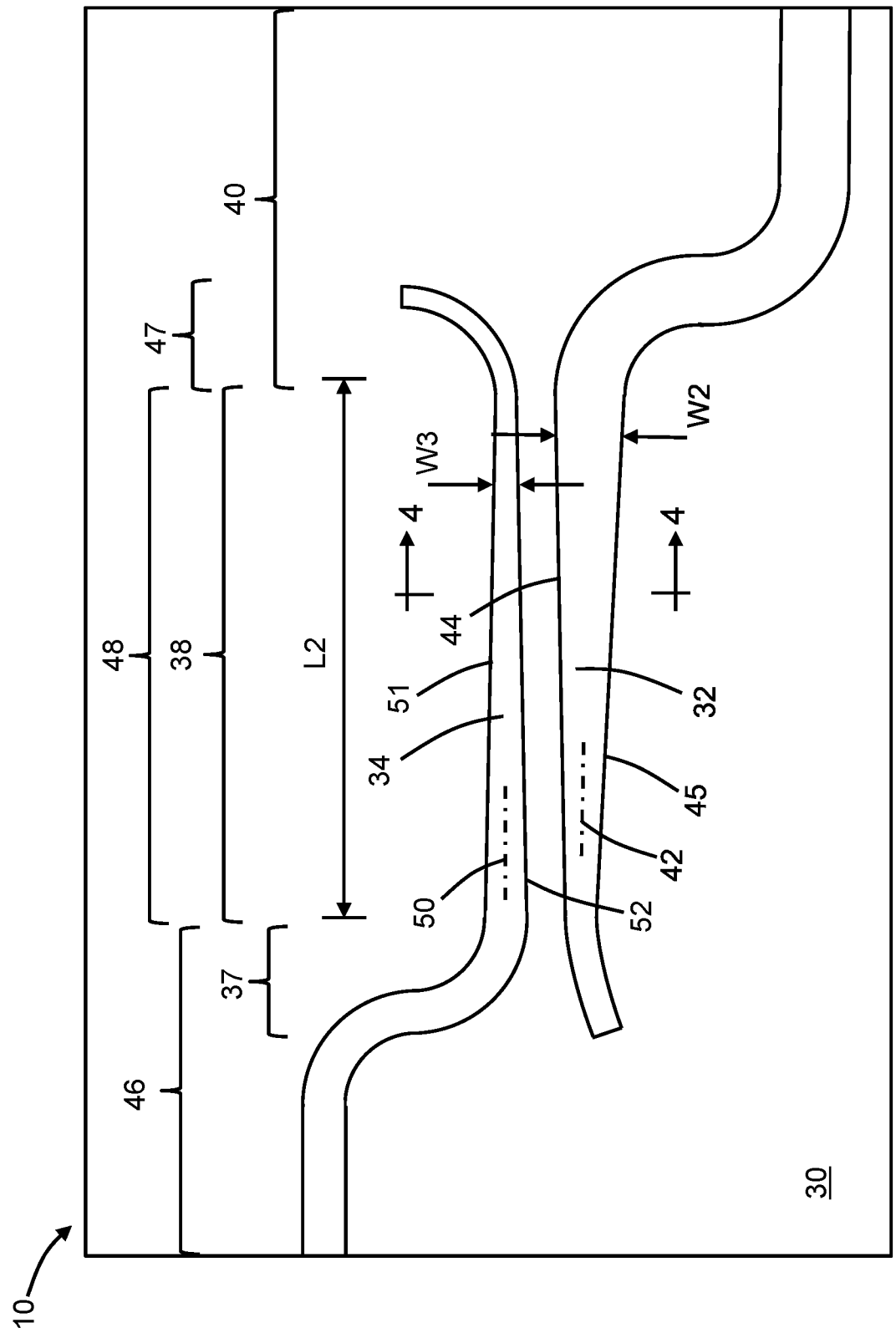
FIG. 3 is a top view of the structure at a fabrication stage subsequent to FIG. 1.

With reference to FIGS. 3, 4 in which like reference numerals refer to like features in FIGS. 1, 2 and at a subsequent fabrication stage, a dielectric layer 30 is formed over the waveguide core 12. The dielectric layer 30 may be comprised of a dielectric material, such as silicon dioxide, having a refractive index that is less than the refractive index of the material constituting the waveguide core 12. The waveguide core 12 is embedded in the dielectric layer 30, which may be deposited and planarized after deposition, because the dielectric layer 30 is thicker than the height of the waveguide core 12.

The structure 10 further includes a waveguide core 32 and a waveguide core 34 that are positioned on, and over, the dielectric layer 30. The waveguide cores 32, 34 may be formed by depositing a layer on the dielectric layer 30 and patterning the deposited layer with lithography and etching processes. In an embodiment, an etch mask may be formed by a lithography process over the deposited layer, and unmasked sections of the deposited layer may be etched and removed with an etching process. The shape of the etch mask determines the patterned shapes of the waveguide cores 32, 34. The waveguide core 12 is positioned in a vertical direction between the waveguide core 32 and the substrate 16, and the waveguide core 34 is laterally offset from the waveguide core 12 and the waveguide core 32.

In an embodiment, the waveguide cores 32, 34 may be comprised of a material having a refractive index that is greater than the refractive index of silicon dioxide. In an embodiment, the waveguide cores 32, 34 may be comprised of a different material than the waveguide core 12. In an embodiment, the waveguide cores 32, 34 may be comprised of a dielectric material, such as silicon nitride, aluminum nitride, or silicon oxynitride. In an alternative embodiment, the waveguide cores 32, 34 may be comprised of a semiconductor material, such as polysilicon or amorphous silicon. In alternative embodiments, other materials, such as a polymer or a III-V compound semiconductor, may be used to form the waveguide cores 32, 34. In an alternative embodiment, a slab layer may be connected to all or part of respective lower portions of the waveguide cores 32, 34. The slab layer may be formed when the waveguide cores 32, 34 are patterned, and the slab layer, which is positioned on the dielectric layer 30, may have a thickness that is less than the thickness of the waveguide cores 32, 34.

The waveguide core 32 includes a tapered section 38 and an output section 40 that is connected to the tapered section 38. In an embodiment, the tapered section 38 may be connected to a bend 37 defining a terminator. The output section 40 of the waveguide core 32 may include a series of bends that laterally displace the routing of the waveguide core 32. The tapered section 38, which extends along a longitudinal axis 42, has opposite sidewalls 44, 45 and a bottom surface 43 that extends from the sidewall 44 to the sidewall 45. The waveguide core 32 is positioned to overlap with the waveguide core 12 to define a stacked waveguide core having multiple layers. The waveguide cores 12, 32 may collectively function to guide light on the photonics chip. The bottom surface 43 of the waveguide core 32 is positioned adjacent to the top surface 28 of the waveguide core 12 with dielectric material of the dielectric layer 30 between the adjacent surfaces 28, 43. The tapered section 38 of the waveguide core 32 overlaps with the tapered section 18 of the waveguide core 12, and the output section 40 of the waveguide core 32 overlaps with the output section 20 of the waveguide core 12.

The waveguide core 32 may have a width dimension W2 that varies over its length. In an embodiment, the width dimension W2 of the tapered section 38 of the waveguide core 32 may increase with decreasing distance from the output section 40. In an embodiment, the width dimension W2 of the tapered section 38 may linearly increase with decreasing distance from the output section 40. In an alternative embodiment, the width dimension W2 of the tapered section 38 may increase with decreasing distance from the output section 40 based on a non-linear function, such as a quadratic function, a cubic function, a parabolic function, a sine function, a cosine function, a Bezier function, or an exponential function. In an embodiment, the tapered section 38 may have a uniform taper angle. In an alternative embodiment, the tapered section 38 may taper in multiple stages each having a different taper angle.

The waveguide core 34 may include an input section 46 and a tapered section 48 connected to the input section 46. In an embodiment, the tapered section 48 may be connected to a bend 47 defining a terminator. The input section 46 of the waveguide core 34 may include a series of bends that laterally offset the routing of the tapered section 48 of the waveguide core 34 to decrease the separation between the tapered section 48 and the stacked tapered sections 18, 38 of the waveguide cores 12, 32. The tapered section 48, which extends along a longitudinal axis 50, has opposite sidewalls 51, 52 and a bottom surface 53 that extends from the sidewall 51 to the sidewall 52. The tapered section 38 of the waveguide core 32 and the tapered section 48 of the waveguide core 34 may extend along a length L2 that is substantially equal to the length L1 of the tapered section 18 of the waveguide core 12.

The waveguide core 34 may have a width dimension W3 that varies over its length. In an embodiment, the width dimension W3 of the tapered section 48 of the waveguide core 34 may decrease with increasing distance from the input section 46. The taper angles of the tapered section 48 and the width dimension W2 of the tapered section 38 change in opposite directions because that the tapered section 48 tapers down (i.e., decreasing width) and the tapered section 34 tapers up (i.e., increasing width). In an embodiment, the width dimension W3 of the tapered section 48 may linearly decrease with increasing distance from the input section 46. In an alternative embodiment, the width dimension W3 of the tapered section 48 may decrease with increasing distance from the input section 46 based on a non-linear function, such as a quadratic function, a cubic function, a parabolic function, a sine function, a cosine function, a Bezier function, or an exponential function. In an embodiment, the tapered section 48 may have a uniform taper angle. In an alternative embodiment, the tapered section 48 may taper in multiple stages each having a different taper angle.

The tapered section 48 of the waveguide core 34 is diagonally positioned relative to the tapered section 18 of the waveguide core 12 and laterally offset relative to the tapered section 38 of the waveguide core 32. The diagonal offset includes a lateral offset D1 in a lateral direction and a vertical offset D2 in a vertical direction that is transverse to the lateral direction. The lateral offset D1 may be measured between the sidewall 44 of the tapered section 38 of the waveguide core 32 and the sidewall 52 of the tapered section 48 of the waveguide core 34. The vertical offset D2 may be measured between the bottom surface 43 of the tapered section 38 of the waveguide core 32 and the top surface 28 of the tapered section 18 of the waveguide core 12. The lateral offset D1 is chosen such that the tapered section 48 of the waveguide core 34 and the tapered section 18 of the waveguide core 12 have a non-overlapping arrangement. The vertical offset D2 is chosen such that the tapered section 38 of the waveguide core 32 and the tapered section 18 of the waveguide core 12, which overlap, have a non-contacting arrangement. In an embodiment, the lateral offset D1 may range from about 50 nanometers (nm) to about 3000 nm. In an embodiment, the vertical offset D2 may range from about 1 nm to about 3000 nm. In an embodiment, the lateral offset D1 may be constant over the respective lengths of the tapered sections 18, 38, 48 such that the gap across which light coupling occurs is constant.

In an alternative embodiment, an additional waveguide core (not shown) may be positioned over the waveguide core 32 and/or an additional waveguide core (not shown) may be positioned over the waveguide core 34.

Figure 5:
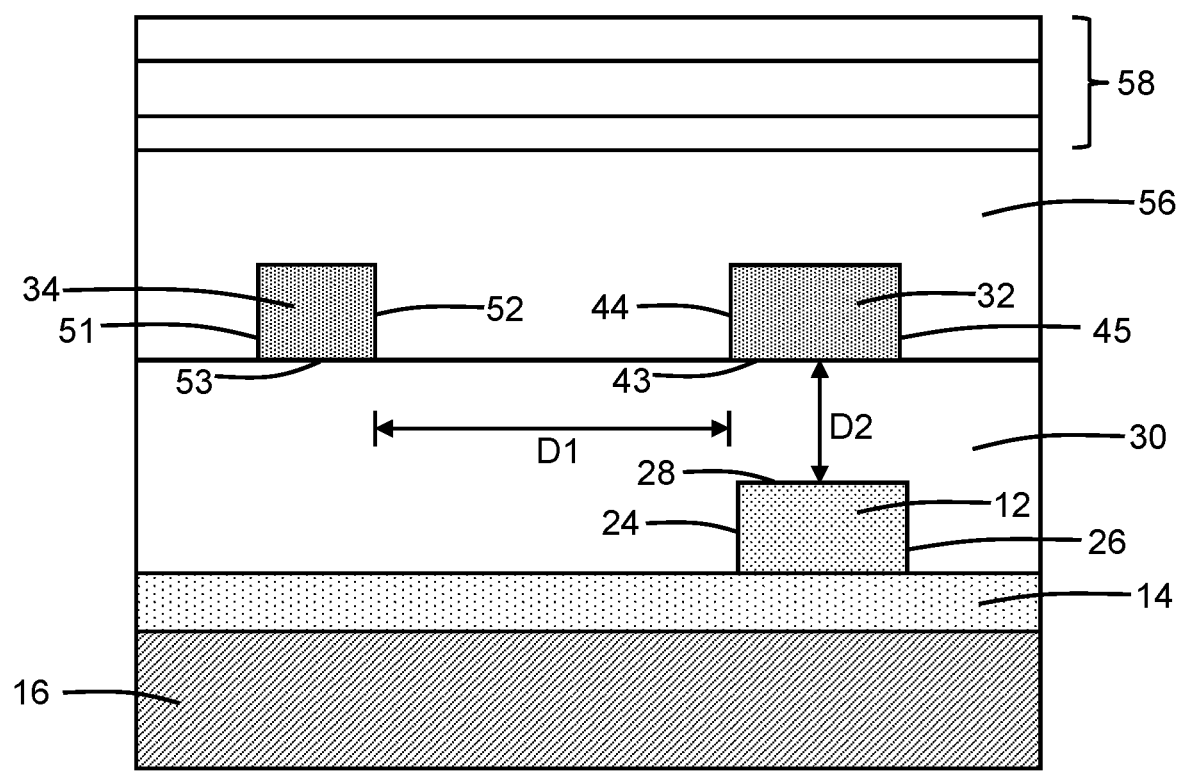
FIG. 5 is a cross-sectional view of the structure at a fabrication stage subsequent to FIG. 4.

With reference to FIG. 5 in which like reference numerals refer to like features in FIG. 4 and at a subsequent fabrication stage, a dielectric layer 56 is formed over the waveguide cores 32, 34. The dielectric layer 56 may be comprised of a dielectric material, such as silicon dioxide, having a refractive index that is less than the refractive index of the material constituting the waveguide cores 32, 34. The waveguide cores 32, 34 are embedded in the dielectric layer 56, which may be deposited and planarized after deposition, because the dielectric layer 56 is thicker than the height of the waveguide cores 32, 34.

A back-end-of-line stack 58 may be formed over the dielectric layer 56. The back-end-of-line stack 58 may include stacked dielectric layers that are each comprised of a dielectric material, such as silicon dioxide, silicon nitride, tetraethylorthosilicate silicon dioxide, or fluorinated-tetraethylorthosilicate silicon dioxide.

In use, light may be guided on a photonics chip by the waveguide core 34 for input to the structure 10. Light may be evanescently coupled from the tapered section 48 of the waveguide core 34 to the stacked tapered sections 18, 38 of the waveguide cores 12, 32. The stacked waveguide cores 12, 32 cooperate to guide the transferred light away from the structure 10. In an alternative embodiment, the light may be further coupled from the stacked tapered sections 18, 38 of the waveguide cores 12, 32 to another waveguide core (not shown) that guides the propagating light away from the structure 10.

The structure 10 may provide a low-loss transition between the waveguide core 34 and the stacked waveguide cores 12, 32. The light coupling between the waveguide core 34 and the stacked waveguide cores 12, 32 may be adiabatic such that coupling to other modes and radiative losses are either negligible or below some operationally acceptable level.

Figure 6:
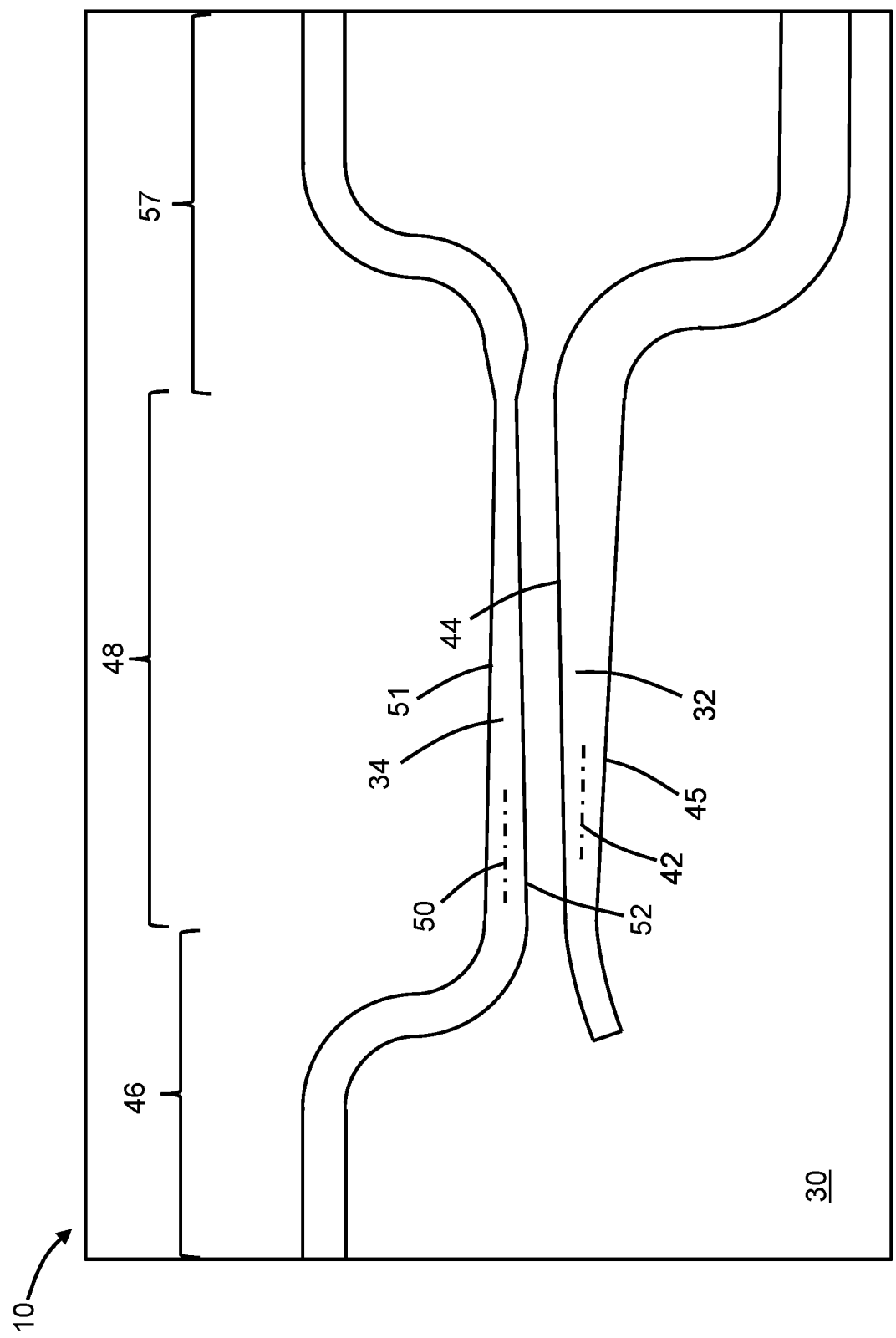
FIG. 6 is a top view of a structure in accordance with alternative embodiments of the invention.

With reference to FIG. 6 and in accordance with alternative embodiments of the invention, the structure 10 may be modified to split the light such that a portion of the light is transferred from the waveguide core 34 to the stacked waveguide cores 12, 32 and another portion of the light is guided away from the structure 10 by the waveguide core 34. To that end, the waveguide core 34 may be modified to add an output section 57 that is configured to guide the light away from the structure 10. The output section 57 of the waveguide core 34 may include a series of bends that laterally displace the routing of the waveguide core 34 away from the waveguide core 32. The splitting ratio between the different output paths for the split light may be selected, for example, by adjusting the dimensions of the waveguide cores 12, 32 and the waveguide core 34.

Figure 7:
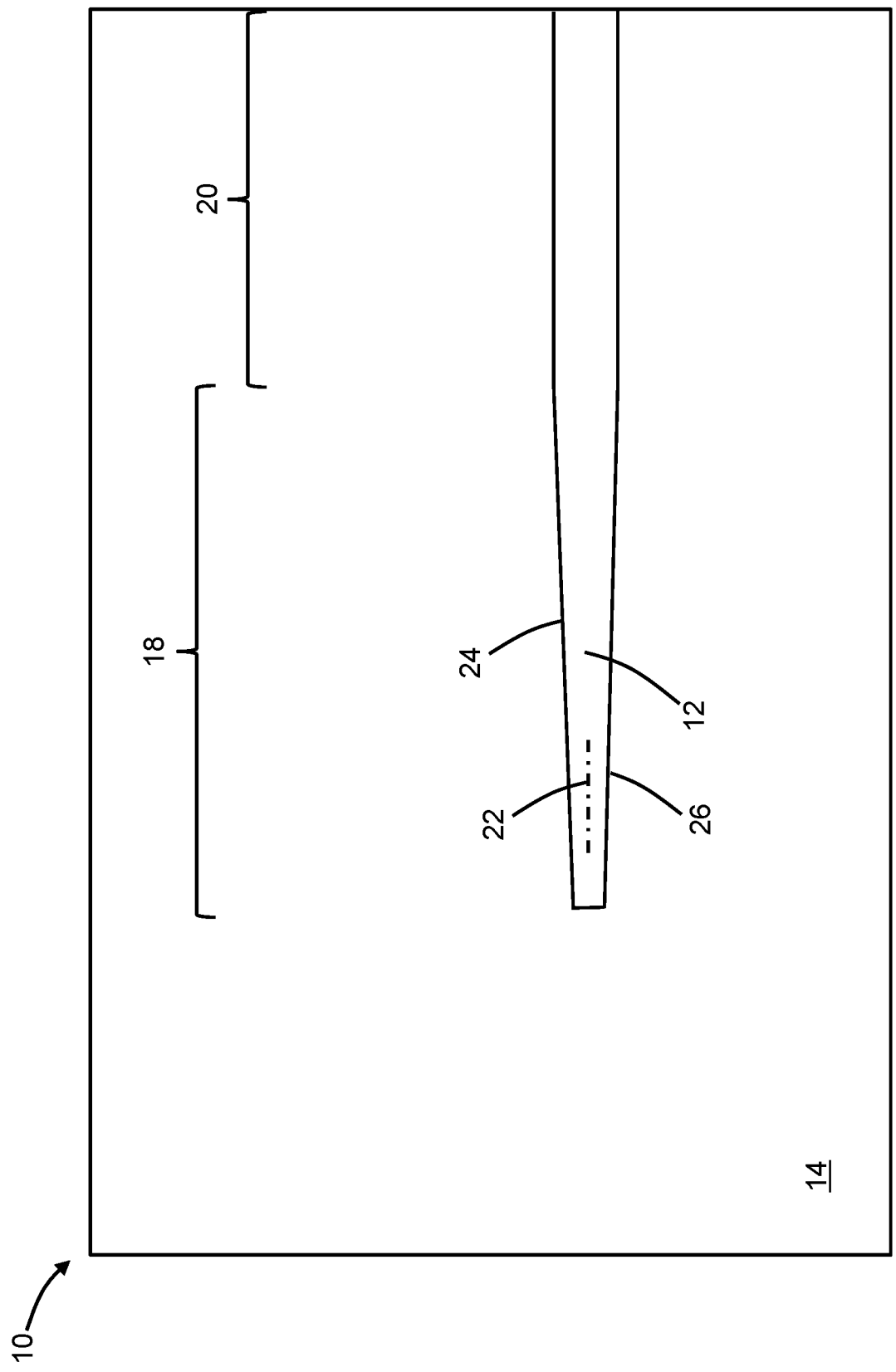
FIG. 7 is a top view of a structure at an initial fabrication stage of a processing method in accordance with alternative embodiments of the invention.

With reference to FIG. 7 and in accordance with alternative embodiments of the invention, the waveguide core 12 may be modified to eliminate the bend 17 and to configure the output section 20 to lack bends.

Figure 8:
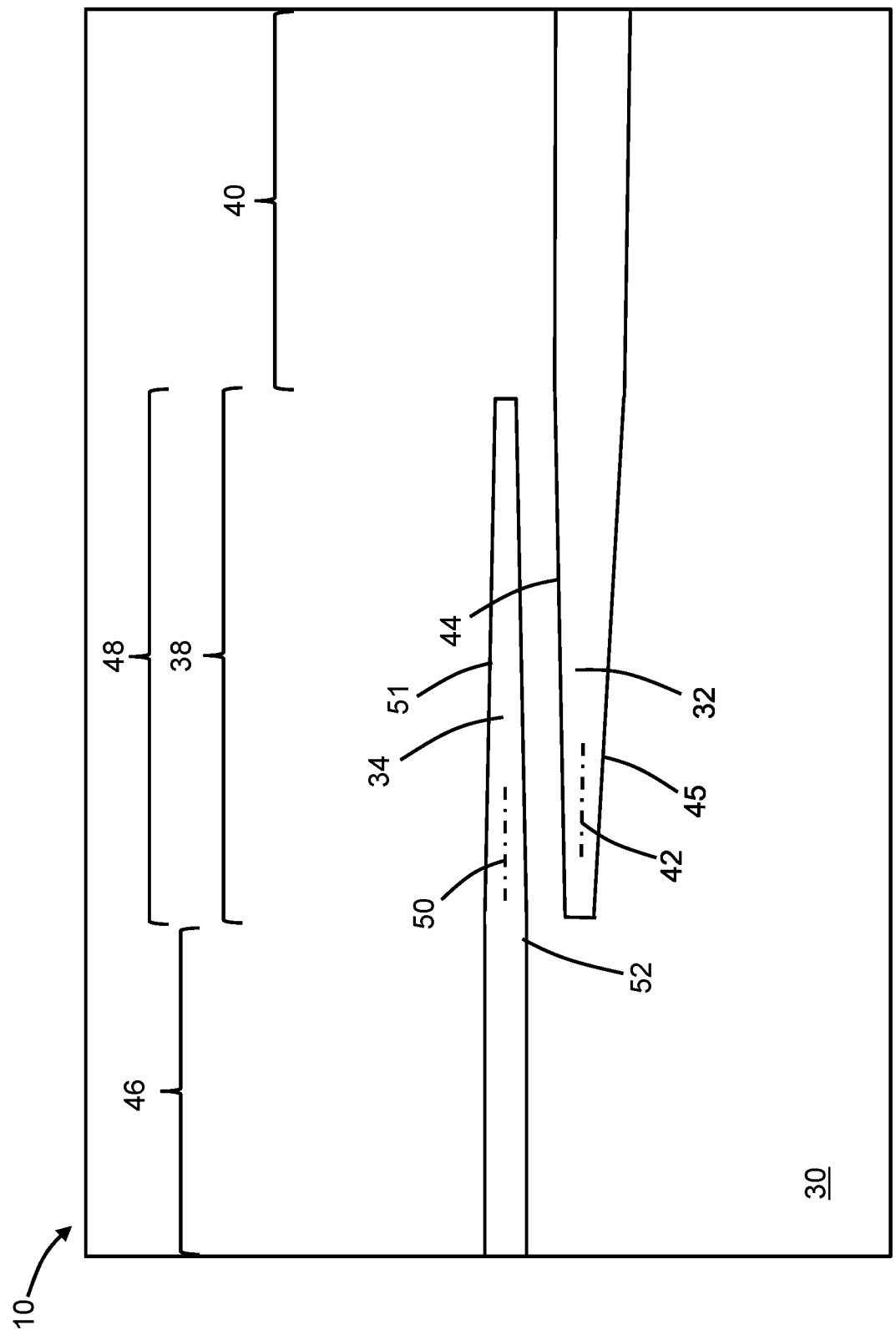
FIG. 8 is a top view of the structure at a fabrication stage subsequent to FIG. 7.

With reference to FIG. 8 in which like reference numerals refer to like features in FIG. 7 and at a subsequent fabrication stage, the waveguide core 32 may be modified to eliminate the bend 37 and to configure the output section 40 to lack bends. The waveguide core 34 may be modified to eliminate the bend 47 and to configure the input section 46 to lack bends. Light transfer still occurs in the structure 10 between the tapered section 48 of the waveguide core 34 and the adjacent tapered sections 18, 38 of the stacked waveguide cores 12, 32.

Figure 9:
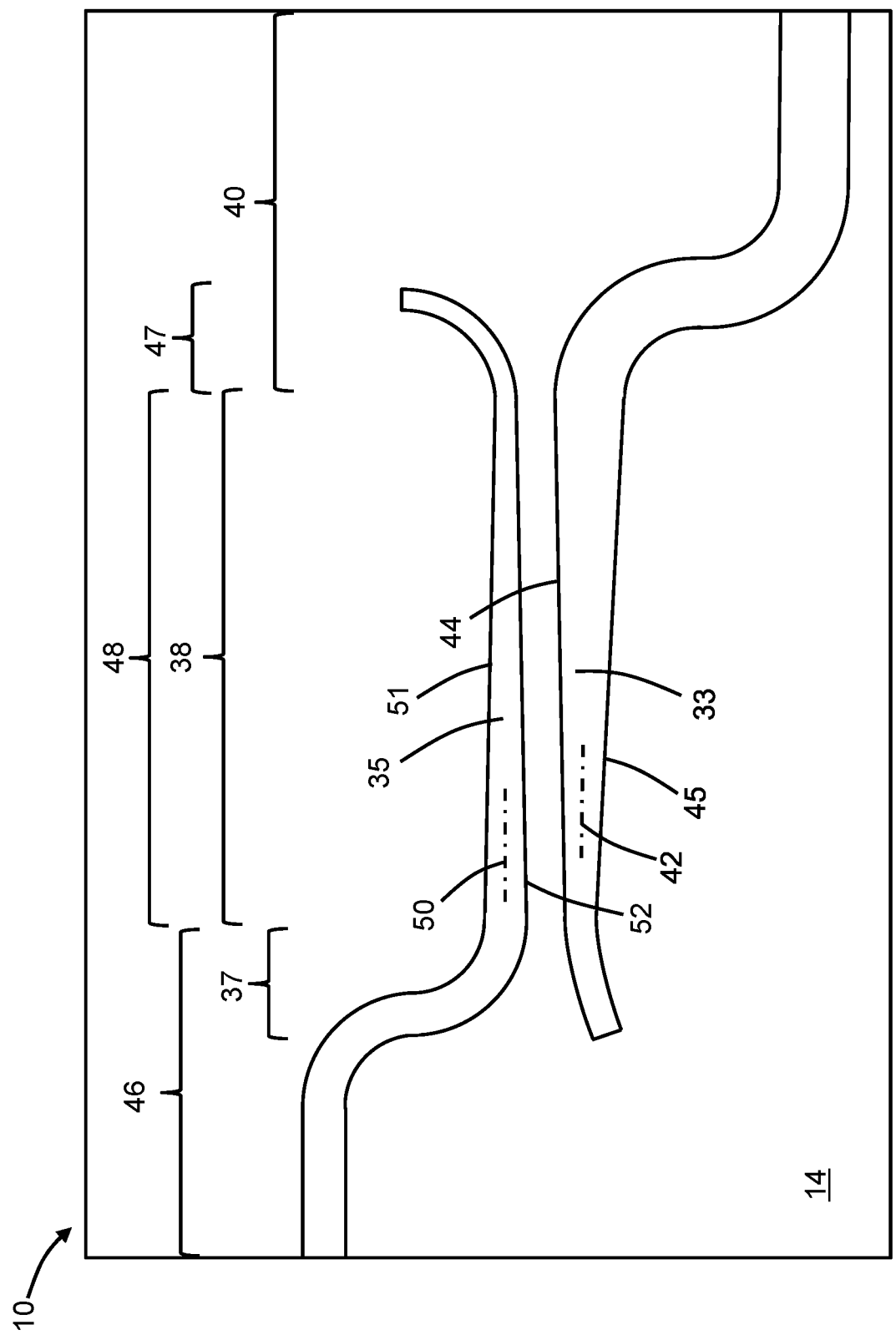
FIG. 9 is a top view of a structure in accordance with alternative embodiments of the invention.

With reference to FIG. 9 and in accordance with alternative embodiments of the invention, the structure 10 may be modified such that waveguide cores 33, 35, which are similar or identical to the waveguide cores 32, 34, are formed on the dielectric layer 14 before the waveguide core 12 is formed. The waveguide cores 33, 35 may be comprised of single-crystal silicon as an additional material option because of the earlier formation in the process flow.

Figure 10:
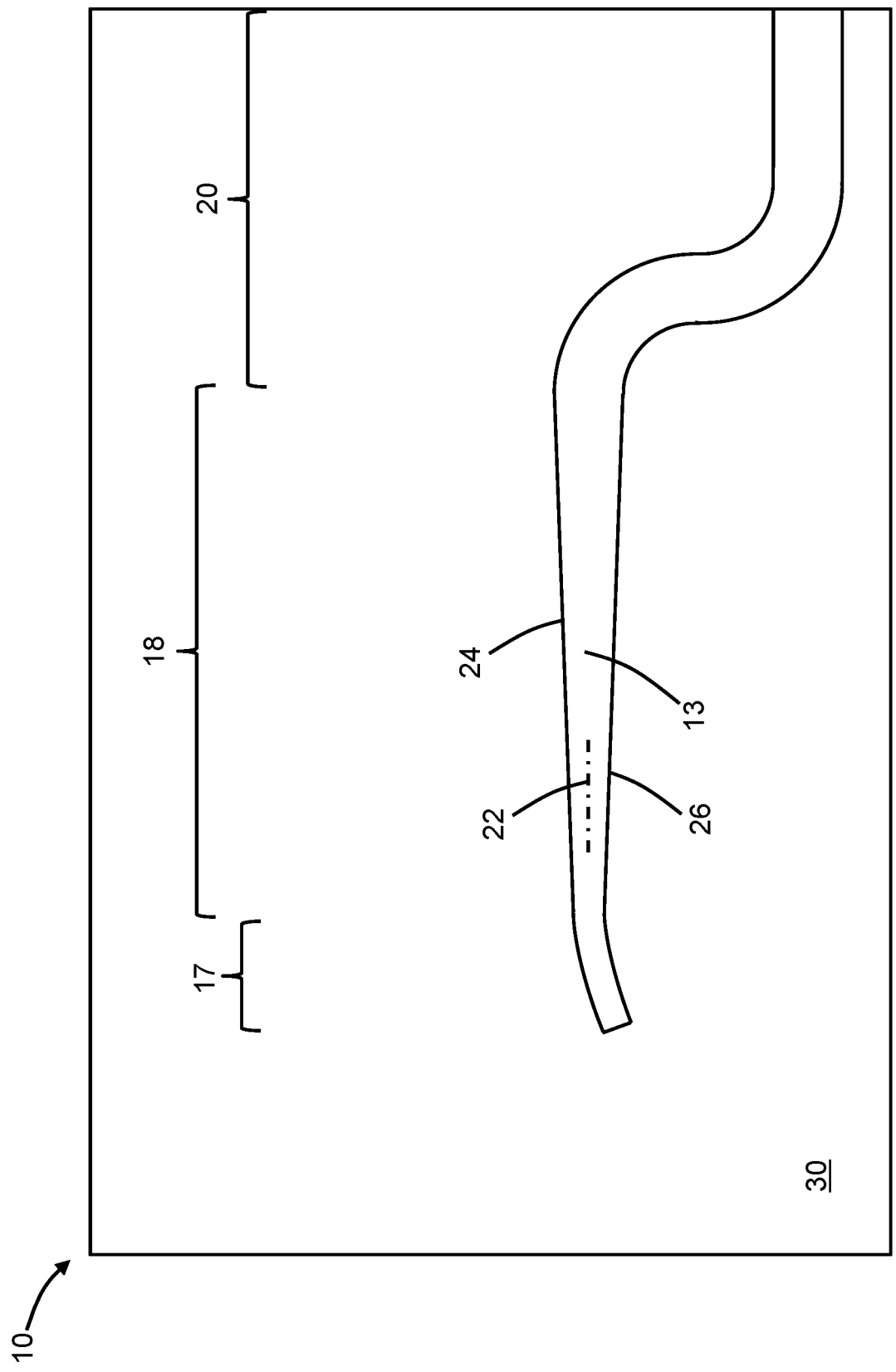
FIG. 10 is a top view of the structure at a fabrication stage subsequent to FIG. 9.

With reference to FIG. 10 in which like reference numerals refer to like features in FIG. 9 and at a subsequent fabrication stage, a waveguide core 13, which is similar or identical to the waveguide core 12, may be formed on the dielectric layer 30 after forming the waveguide cores 33, 35, which are embedded in the dielectric layer 30. The waveguide core 13 is stacked with the waveguide core 33 to define a stacked waveguide core in which the waveguide core 33 is positioned in a vertical direction between the waveguide core 13 and the substrate 16. Light transfer still occurs in the structure 10 between the tapered section 48 of the waveguide core 35 and the adjacent tapered sections 18, 38 of the stacked waveguide cores 13, 33.

In an alternative embodiment, an additional waveguide core (not shown) may be positioned over the waveguide core 13 and/or an additional waveguide core (not shown) may be positioned over the waveguide core 35.

Figure 11:
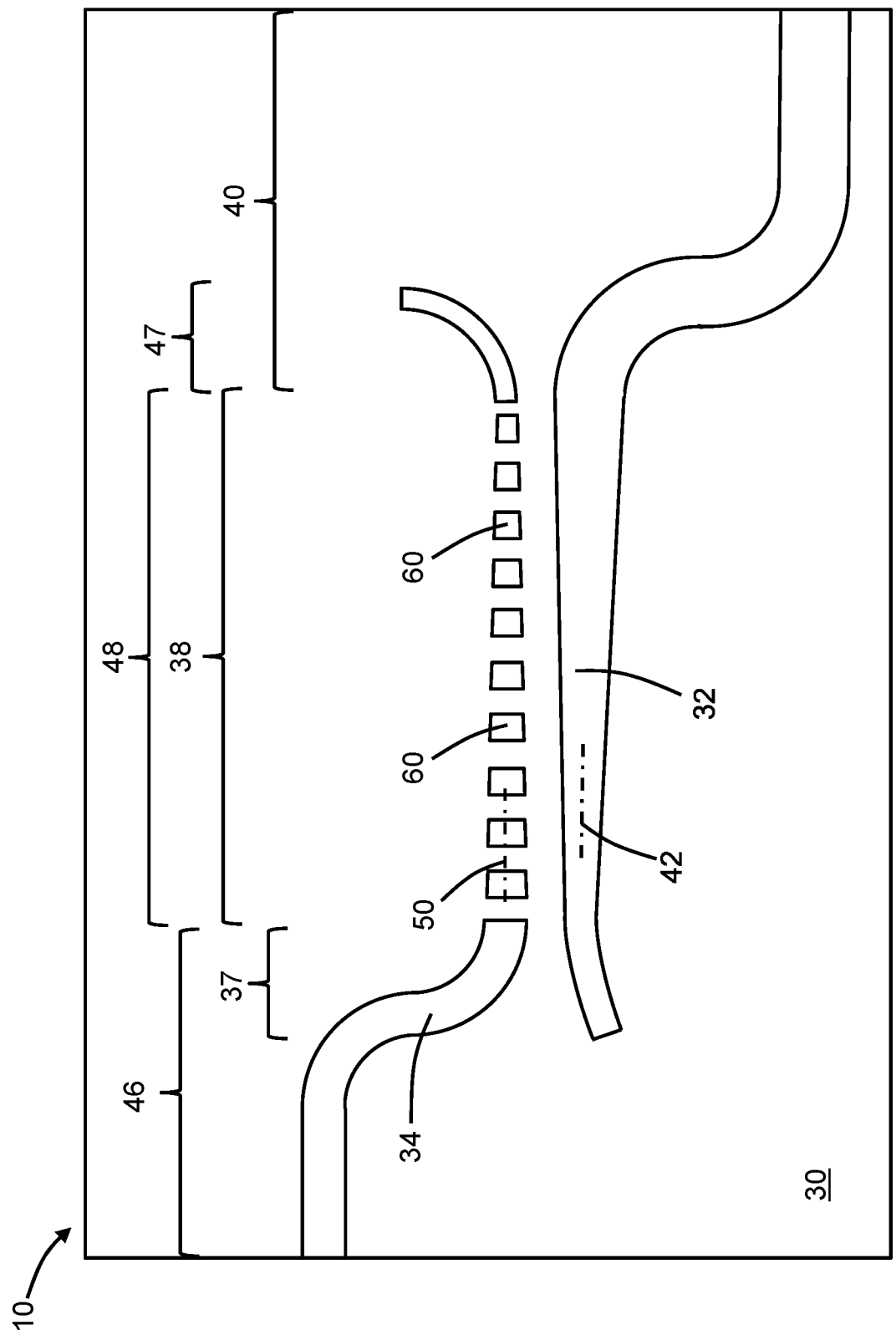
FIG. 11 is a top view of a structure in accordance with alternative embodiments of the invention.

With reference to FIG. 11 and in accordance with alternative embodiments, the structure 10 may be modified such that the tapered section 48 of the waveguide core 34 includes segments 60 that are positioned with a spaced-arrangement along the longitudinal axis 50. Adjacent pairs of the segments 60 are separated by spaces or gaps. In an embodiment, the pitch and duty cycle of the segments 60 may be uniform to define a periodic arrangement. In alternative embodiments, the pitch and/or the duty cycle of the segments 60 may be apodized (i.e., non-uniform) to define a non-periodic arrangement. The segments 60 may be dimensioned and positioned at small enough pitch so as to define a sub-wavelength grating that does not radiate or reflect light at a wavelength of operation, such as a wavelength in a range of 400 nm to 3000 nm.

The subsequently-deposited dielectric layer 56 is disposed in the gaps between adjacent pairs of the segments 60. The segments 60 and the dielectric material of the dielectric layer 56 in the gaps between adjacent segment pairs may define a metamaterial structure in which the material constituting the segments 60 has a higher refractive index than the dielectric material of the dielectric layer 56. The metamaterial structure can be treated as a homogeneous material having an effective refractive index that is intermediate between the refractive index of the material constituting the segments 60 and the refractive index of the dielectric material constituting the dielectric layer 56.

In an alternative embodiment, the waveguide core 35 of FIG. 9 may be modified to include segments similar or identical to the segments 60 and may define a sub-wavelength grating. The gaps between the segments of the waveguide core 35 are filled by the subsequently-deposited dielectric layer 30 to define a metamaterial structure.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a stacked waveguide core including a first waveguide core and a second waveguide core, the first waveguide core including a first bend and a first tapered section connected to the first bend, the first bend terminating the first waveguide core, the second waveguide core including a second bend and a second tapered section connected to the second bend, the second bend terminating the second waveguide core, and the second tapered section positioned to overlap with the first tapered section; and
a third waveguide core including third bend and a third tapered section connected to the third bend, the third bend terminating the third waveguide core, and the third tapered section positioned adjacent to the first tapered section of the first waveguide core and the second tapered section of the second waveguide core.

2. The structure of claim 1 wherein the first waveguide core comprises a first material, and the second waveguide core comprises a second material different from the first material.

3. The structure of claim 2 wherein the third waveguide core comprises the second material.

4. The structure of claim 2 wherein the first material is silicon, and the second material is silicon nitride.

5. The structure of claim 2 wherein the first material is silicon nitride, and the second material is silicon.

6. The structure of claim 1 wherein the third tapered section of the third waveguide core is spaced in a lateral direction from the first tapered section of the first waveguide core.

7. The structure of claim 6 wherein the second tapered section of the second waveguide core is diagonally spaced from the third tapered section of the third waveguide core.

8. The structure of claim 1 wherein the third tapered section of the third waveguide core is spaced in a lateral direction from the second tapered section of the second waveguide core.

9. The structure of claim 8 wherein the first tapered section of the first waveguide core is diagonally spaced from the third tapered section of the third waveguide core.

10. The structure of claim 1 further comprising:
a substrate,
wherein the first waveguide core is positioned between the second waveguide core and the substrate.

11. The structure of claim 10 further comprising:
a dielectric layer positioned between the first waveguide core and the second waveguide core, the dielectric layer comprising a dielectric material.

12. The structure of claim 1 wherein the third tapered section of the third waveguide core includes a plurality of segments that are longitudinally positioned in a spaced-apart arrangement.

13. The structure of claim 1 wherein the first tapered section has a taper angle, and the third tapered section has a taper angle that is opposite to the taper angle of the first tapered section.

14. The structure of claim 1 wherein the third waveguide core includes an input section connected to the third tapered section.

15. The structure of claim 14 wherein the third waveguide core includes an output section, and the third tapered section is longitudinally positioned between the input section and the output section.

16. The structure of claim 1 wherein the first tapered section, the second tapered section, and the third tapered section have respective lengths that are substantially equal.

17. The structure of claim 1 wherein the first tapered section has a width dimension that varies based on a non-linear function.

18. The structure of claim 1 wherein the second tapered section has a width dimension that varies based on a non-linear function.

19. The structure of claim 1 wherein the third tapered section has a width dimension that varies based on a non-linear function.

20. A method comprising:
forming a stacked waveguide core including a first waveguide core and a second waveguide core, wherein the first waveguide core includes a first bend and a first tapered section connected to the first bend, the first bend terminating the first waveguide core, the second waveguide core includes a second bend and a second tapered section connected to the second bend, the second bend terminating the second waveguide core, and the second tapered section positioned to overlap with the first tapered section; and
forming a third waveguide core including a third bend and a third tapered section connected to the third bend, wherein the third bend terminates the third waveguide core, and the third tapered section is positioned adjacent to the first tapered section of the first waveguide core and the second tapered section of the second waveguide core.

\* \* \* \* \*